F. H. HAMBLIN.
KITCHEN UTENSIL.
APPLICATION FILED DEC. 14, 1908.
939,251.
Patented Nov. 9, 1909.
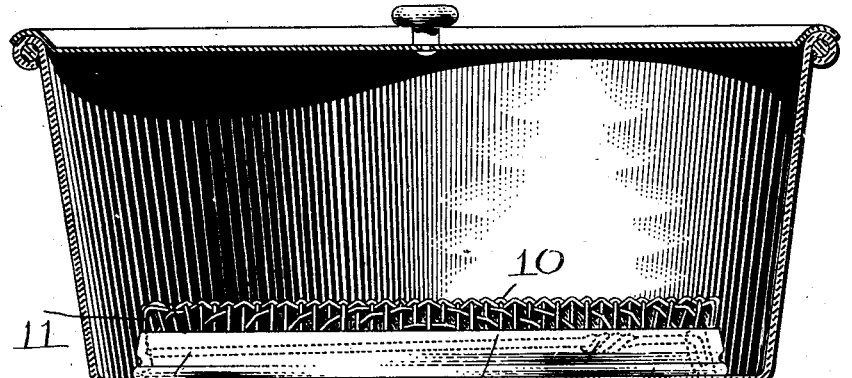
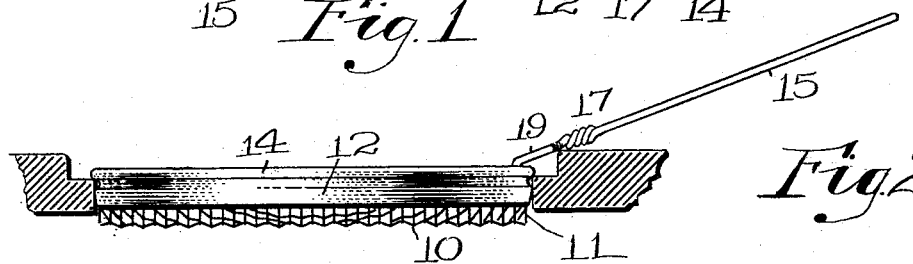
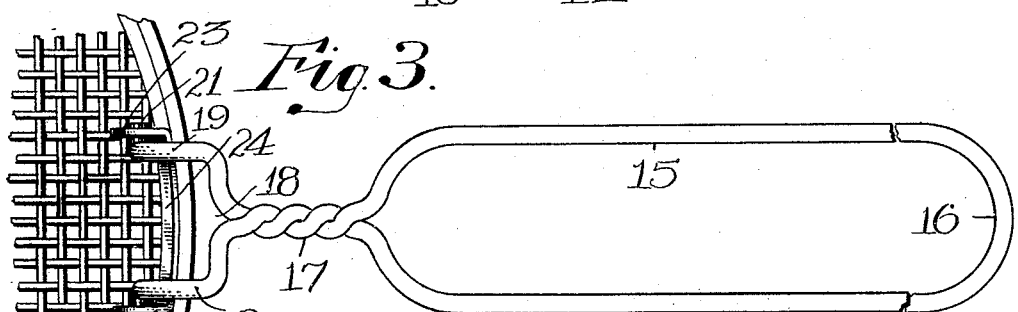
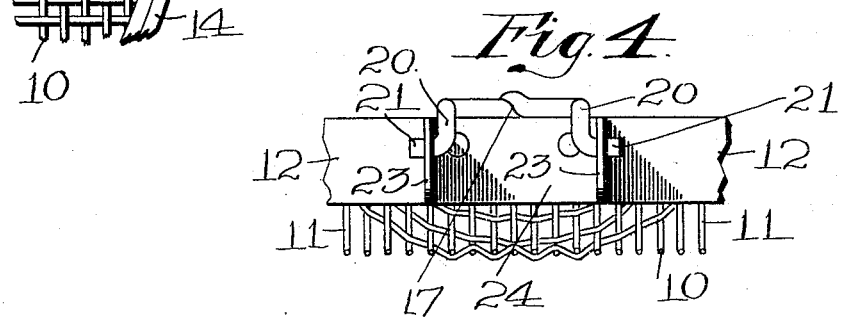
Witnesses:
H. M. Rugg
C. F. Nixon
Inventor:
F. H. Hamblin
By Attorneys
Southgate & Southgate
ANDREW B. GRAHAM CO., PHOTO-LITHOGRAPHERS, WASHINGTON, D. C.

UNITED STATES PATENT OFFICE.

FRANK H. HAMBLIN, OF WORCESTER, MASSACHUSETTS.

KITCHEN UTENSIL.

939,251. Specification of Letters Patent. Patented Nov. 9, 1909.

Application filed December 14, 1908. Serial No. 467,529.

*To all whom it may concern:*

Be it known that I, FRANK H. HAMBLIN, a citizen of the United States, residing at Worcester, in the county of Worcester and State of Massachusetts, have invented a new and useful Kitchen Utensil, of which the following is a specification.

This invention relates to a kitchen utensil which, while of exceedingly simple construction, is capable of a large number of uses.

The principal object of the invention is to provide a simple and inexpensive construction of kitchen utensil which shall be capable of use for many purposes. A construction is employed involving a circular plate having a perpendicular circular wall at the edge thereof, and provided with a handle which is of such form that it will serve efficiently for handling the device when used as a broiler, toaster, frying basket, strainer, ladle, etc. and which can be moved into the utensil and removably held therein by the circular wall when it is to be used as a kettle bottom, cake cooler, sad-iron stand and the like.

The invention also involves novel features of construction whereby the device can be made in a simple, inexpensive and expeditious manner and whereby it will be particularly effective for the purposes intended.

Further objects and advantages of the invention will appear hereinafter.

Reference is to be had to the accompanying drawings in which,

Figure 1 is a central vertical sectional view showing one form of the invention used as a false kettle bottom. Fig. 2 is a side view of the same showing it employed as a toaster or the like. Fig. 3 is a plan of a portion of the same showing the construction of the handle, and Fig. 4 is a fragmentary inside end view showing the same feature.

The utensil preferably is formed with a top or bottom plate 10 formed of foraminous material and shown in the present instance as of woven wire fabric. This plate sometimes serves as the bottom and sometimes as the top of the device and consequently it will be referred to generally simply as a plate. It preferably is circular in form and is provided at its edges with a continuous circumferential side wall 11 integral with the plate and formed of a continuation of the foraminous material thereof. The circular edge of this side wall is shown as provided with a binding 12 formed generally of a single sheet of metal. This binding extends both on the inside and outside of the foraminous side wall and is provided with an inwardly extending bead or tongue 14 near the edge. This forms a neat and smooth bottom or top edge for the utensil and also the bead or tongue which surrounds it, being formed when or after the binding is placed on the edges of the wire fabric, binds the latter and securely holds the same to the binding.

The device as so far described can be used in the way shown in Fig. 1, as a false kettle bottom or in the same position outside the kettle it can be used as a sad-iron stand or a cake cooler. On account of the continuous edge suport 11 and its binding, a very strong construction is obtained, which is particularly desirable when it is used as a sad-iron stand, and yet, on account of the construction of the plate 10 and walls 11 air or water, as the case may be, can circulate through it in all directions thus rendering it particularly efficient for these purposes. It will be seen that the device is capable of these three uses without any change and that the ways in which it is used for these purposes are very similar. In order to adapt it for other uses mentioned, a handle 15 is provided. This handle in the form shown consists of a single integral piece of wire having a looped portion 16, the two legs of which are twisted together at 17 to strengthen the handle. The two ends of the wire then diverge at 18 and form parallel bars 19 which if desired can be substantially continuations of the two legs of the main loop but at any rate preferably are in the plane thereof. These two legs are bent down to form feet 20 which are provided with integral projections 21 in alinement with each other. These are shown in the present instance as projecting outwardly. They may be pivotally mounted on the utensil in any desired way but in the present case they are shown as extending through perforations in two inwardly extending parallel ears 23 which are mounted on the inside of the utensil and near the edge thereof. These ears also are shown as integral with a plate 24 which is riveted to the binding of the utensil. When the handle is swung outwardly, as shown in Figs. 3 and 4, the bars 19 bear against the edge of the utensil which forms a fulcrum so that the handle can be used for manipulating the device. In this way it can be used as a vegetable strainer, ladle, fry basket or berry washer and it is particularly useful as an odorless broiler or toaster because on account of the bead in the edge of the binding, this binding projects out at the top and conveniently can be made of any proper size to fit into an ordinary stove-lid opening and be supported therein by the beaded edge.

It will be seen that for all of these purposes the utensil is used with the plate 10 as the bottom and the handle extending outwardly.

Now referring to the use of the device again as a kettle bottom, cake cooler or sadiron stand, with the plate at the top and the sides serving to support it, it is to be observed that the handle can be turned around on its pivots and is of just such length that when it is turned inside the utensil its end will pass the inwardly projecting bead at the opposite side and will be held inside the utensil thereby, although it can easily be removed by exerting a little pressure on the yielding material. Moreover, on account of the shape of the feet 20 this brings the handle well inside the edges of the utensil and spaced only a short distance from the plate 10.

While I have illustrated and described a preferred embodiment of the invention and mentioned a number of ways to which it may be used, I am aware that many modifications may be made in the construction of the device and that it can be used for many other purposes without departing from the scope of the invention as expressed in the claims. Therefore, I do not wish to be limited to the particular uses or to all the details of construction shown and described, but What I do claim is:—

1. As an article of manufacture, a circular foraminous plate having its edges upturned and forming an integral circumferential wall surrounding the same, a handle pivotally mounted on the inner side of said wall below the top thereof and adapted to project over and rest on the top thereof and capable of swinging inside the wall, said wall being provided with an inward projection on the inside opposite the point at which the handle is pivoted for removably holding the end of the handle.

2. As an article of manufacture, a kitchen utensil comprising a circular foraminous plate, continuous circumferential side walls extending from the edge thereof constituting an integral continuation of the foraminous material, a sheet metal binding on the edge of the side walls, said binding having an inwardly projecting circumferential bead near the outer edge thereof for clamping the edge of the foraminous material, and a handle consisting of a single piece of wire of substantially the same length as the diameter of said plate pivoted to the circumferential side wall, whereby when swung over on its pivots inside the utensil, the end of the handle will engage under the bead on the opposite side and be removably held in position therein.

3. As an article of manufacture, a kitchen utensil comprising a circular foraminous plate, continuous circumferential side walls extending from the edge thereof constituting an integral continuation of the foraminous material, a sheet metal binding on the edge of the side wall, said binding having an inwardly projecting circumferential bead near the outer edge thereof for clamping the edge of the foraminous material, a sheet metal plate fixed to said sheet metal binding and having two perforated ears thereon inside said binding, and a handle consisting of a single piece of wire the opposite ends thereof being offset from the handle and forming pivots in the perforations of said ears and said handle being of substantially the same length as the diameter of said plate, whereby when swung over on its pivots inside the utensil, the end of the handle will engage under the bead on the opposite side and be removably held in position therein.

4. As an article of manufacture, a kitchen utensil having on the inner surface thereof near the edge a plate having two inwardly extending perforated ears and provided with a handle having a main body in a plane, and a pair of outwardly extending projections below said plane, said projections extending through said perforations, whereby the handle can be swung outwardly on its pivots and the body thereof will engage the edge of the utensil so as to serve for supporting the same and whereby the handle can be swung over into the utensil and will then occupy a position at a distance from the edge thereof.

5. As an article of manufacture, a kitchen utensil having near the edge thereof two inwardly projecting perforated ears, and a handle comprising a body substantially in a plane provided with two legs projecting at right-angles to said plane at one end of the handle, said legs having integral projections in alinement entering said perforations, whereby said handle is pivotally mounted on the inside of the edge of the utensil and when swung outwardly it will engage the edge of the utensil to form a fulcrum and when swung inwardly will be located at a distance from said edge.

In testimony whereof I have hereunto set my hand, in the presence of two subscribing witnesses.

FRANK H. HAMBLIN.

Witnesses:
ALBERT E. FAY,
C. FORREST WESSON.